(12) United States Patent
Lahoda et al.

(10) Patent No.: US 11,031,145 B2
(45) Date of Patent: Jun. 8, 2021

(54) METHOD OF MANUFACTURING A REINFORCED NUCLEAR FUEL CLADDING USING AN INTERMEDIATE THERMAL DEPOSITION LAYER

(71) Applicant: WESTINGHOUSE ELECTRIC COMPANY, LLC, Cranbery Township, PA (US)

(72) Inventors: Edward J. Lahoda, Edgewood, PA (US); Andrew J. Mueller, Elizabeth, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 814 days.

(21) Appl. No.: 15/450,167

(22) Filed: Mar. 6, 2017

(65) Prior Publication Data

US 2018/0254114 A1 Sep. 6, 2018

(51) Int. Cl.
*G21C 21/02* (2006.01)
*G21C 3/04* (2006.01)
(Continued)

(52) U.S. Cl.
CPC .............. *G21C 21/02* (2013.01); *G21C 3/042* (2013.01); *G21C 3/10* (2013.01); *G21C 3/20* (2013.01);
(Continued)

(58) Field of Classification Search
CPC .......... G21C 21/02; G21C 3/042; G21C 3/10; G21C 3/20; G21C 3/045; G21C 3/047;
(Continued)

(56) References Cited

U.S. PATENT DOCUMENTS 2,941,933 A   6/1960  Roake et al.
3,088,893 A *  5/1963  Spalaris .................. G21C 3/20
                                                228/131
(Continued)

FOREIGN PATENT DOCUMENTS

RU        2305334 C1 *  8/2007
WO        WO-0026921 A2 *  5/2000  ............. G21C 19/40
WO        2015/183396 A1  12/2015

OTHER PUBLICATIONS

Gauthier, Michelle. Forming and Predensification of Ceramics. Chapter spanning pp. 763-783 in Engineered Materials Handbook, ASM. 1995. <https://dl.asminternational.org/handbooks/book/48/chapter/567318/Fornning-and-Predensification-of-Ceramics>. 21 pages. (Year: 1995).*

(Continued)

*Primary Examiner* — Lily C Garner
(74) *Attorney, Agent, or Firm* — K&L Gates LLP

(57) ABSTRACT

A method is described that includes the steps of making a thin walled Zr alloy tube, loading nuclear fuel pellets into the tube, compressing the tube onto the fuel pellets to substantially reduce free space around the fuel pellets, positioning end plugs at each of two ends of the tube, filling the tube with a heat transferring gas, and coating the compressed tube with a corrosion resistant material using a thermal deposition process, such as cold spray, before inserting the tube into a pre-formed SiC composite cover having at least one closed end.

32 Claims, 9 Drawing Sheets

(51) Int. Cl.
*G21C 3/10* (2006.01)
*G21C 3/20* (2006.01)
*G21C 3/06* (2006.01)
*C23C 24/04* (2006.01)
*C04B 35/622* (2006.01)
*B22F 3/04* (2006.01)

(52) U.S. Cl.
CPC ............... *B22F 3/04* (2013.01); *C04B 35/622* (2013.01); *C04B 2235/604* (2013.01); *C23C 24/04* (2013.01); *F05D 2230/31* (2013.01); *G21C 3/045* (2019.01); *G21C 3/047* (2019.01); *G21C 3/06* (2013.01); *Y02E 30/30* (2013.01)

(58) Field of Classification Search
CPC ........ C23C 24/04; B22F 3/04; F05D 2230/31; C04B 2235/604; C04B 35/622
See application file for complete search history.

(56) References Cited

U.S. PATENT DOCUMENTS

| | | | |
|---|---|---|---|
| 3,427,222 A | 2/1969 | Biancheria et al. | |
| 4,436,677 A * | 3/1984 | Radford | G21C 3/623 252/643 |
| 4,865,804 A | 9/1989 | McGeary et al. | |
| 4,925,619 A * | 5/1990 | Sparrow | G21C 17/06 33/DIG. 13 |
| 4,971,753 A * | 11/1990 | Taylor, Jr. | G21C 3/18 376/414 |
| 5,075,075 A | 12/1991 | Kapil | |
| 5,182,077 A | 1/1993 | Feinroth | |
| 5,236,021 A * | 8/1993 | Bewlay | B65B 39/00 141/284 |
| 5,302,414 A | 4/1994 | Alkhimov et al. | |
| 5,338,576 A | 8/1994 | Hanzawa et al. | |
| 5,391,428 A | 2/1995 | Zender | |
| 5,490,969 A | 2/1996 | Bewlay et al. | |
| 5,517,540 A | 5/1996 | Marlowe et al. | |
| 6,246,740 B1 | 6/2001 | Maruyama et al. | |
| 7,139,360 B2 | 11/2006 | Lahoda | |
| 8,085,894 B2 * | 12/2011 | Arsenlis | G21C 3/04 376/411 |
| 8,675,809 B2 | 3/2014 | Lahoda et al. | |
| 8,792,607 B2 | 7/2014 | Kim et al. | |
| 8,971,476 B2 | 3/2015 | Mazzoccoli et al. | |
| 9,336,909 B2 | 5/2016 | Mazzoccoli et al. | |
| 2004/0037954 A1 * | 2/2004 | Heinrich | C23C 24/04 427/180 |
| 2006/0039524 A1 | 2/2006 | Feinroth et al. | |
| 2007/0189952 A1 | 8/2007 | Easler et al. | |
| 2007/0253522 A1 * | 11/2007 | Ballagny | G21C 3/28 376/426 |
| 2012/0314831 A1 * | 12/2012 | Terrani | G21C 3/626 376/409 |
| 2013/0292361 A1 * | 11/2013 | Fischer | B23K 9/028 219/74 |
| 2013/0344348 A1 | 12/2013 | Koo et al. | |
| 2014/0254740 A1 | 9/2014 | Ledford et al. | |
| 2015/0050521 A1 | 2/2015 | Le Flem et al. | |
| 2015/0078505 A1 * | 3/2015 | Xu | C04B 37/001 376/451 |
| 2015/0348652 A1 * | 12/2015 | Mazzoccoli | G21C 21/16 376/409 |

OTHER PUBLICATIONS

Samoilov, A. G., and V. S. Volkov. "Fuel elements of nuclear reactors." The Soviet Journal of Atomic Energy 6.3 (1960): 150-164. <https://rd.springer.com/article/10.1007/BF01481447>. (Year: 1960).*

Yanai, K., et al. "Characterization of ceramic powder connpacts." Journal of nuclear materials 224.1 (1995): 79-84. <https://www.sciencedirect.com/science/article/pii/0022311595000348>. (Year: 1995).*

A. Moridi; Cold Spray Coating: Review of Material Systems and Future Perspective; Surface Engineering, 2014, pp. 369-395; vol. 36, No. 6.

K. Sridharan; Cold Spray Materials Deposition Technology; Power Point Presentation, International Thermal Spray Conference; 2012; Department of Engineering Physics, University of Wisconsin—Madison; pp. 1-34.

R.W. Smith; Plasma Spray Deposition: A Need for Direct Process Control; pp. 1169-1183; Drexel University, Philadelphia, PA. (Publication date unknown).

An Introduction of Thermal Spray; Oerlikon Metco; Nov. 2015; Issue 6, pp. 1-24.

I.J. Van Rooyen; SiC—CMC-Zircaloy-4 Nuclear Fuel Cladding Performance During 4-Point Tubular Bend Testing; Idaho National Laboratory; Idaho Falls, ID 83415-6188; Sep. 2013; pp. 1-8.

International Search Report and Written Opinion of the International Searching Authority for PCT/US2018/019923 dated Aug. 27, 2018 (Forms PCT/ISA/220, PCT/ISA/210, PCT/ISA/237).

* cited by examiner

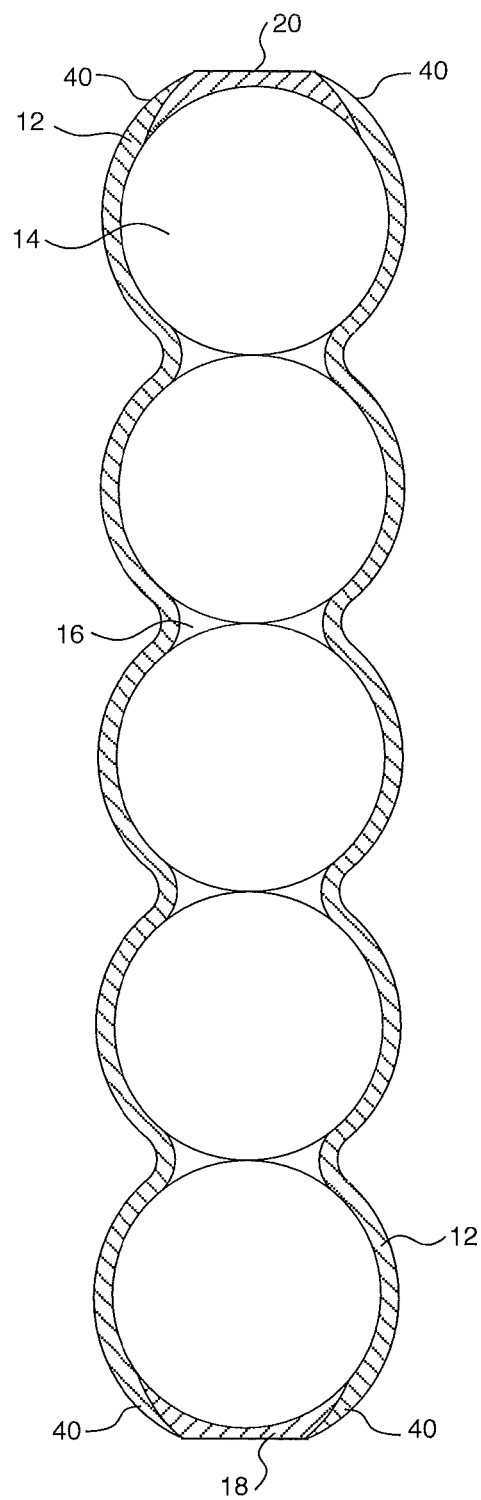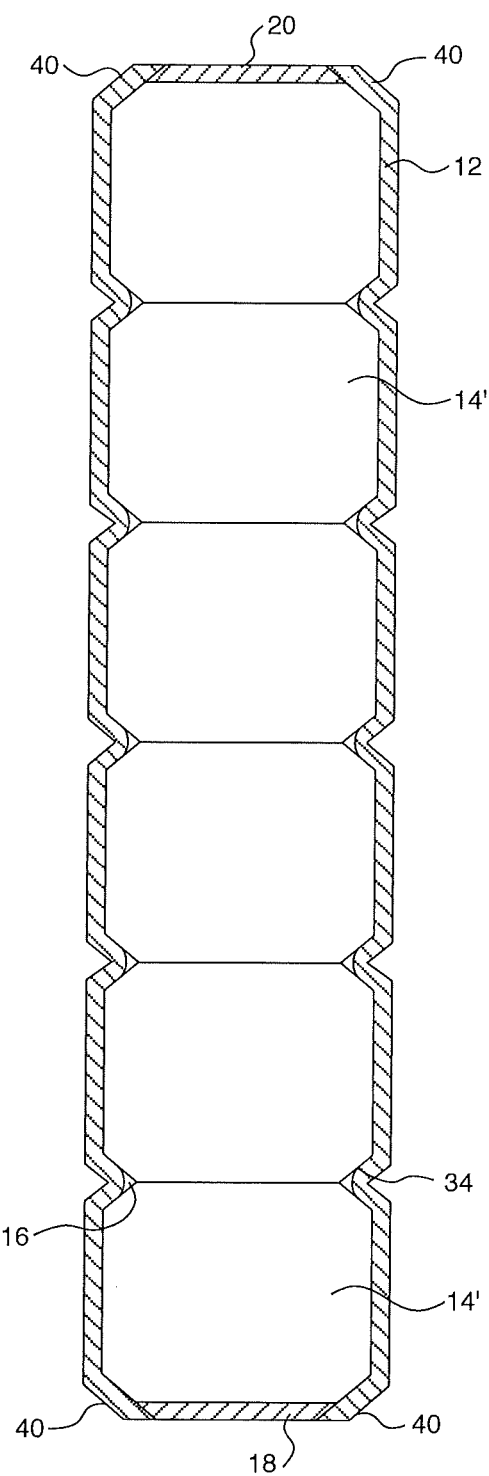
FIG. 8
FIG. 9

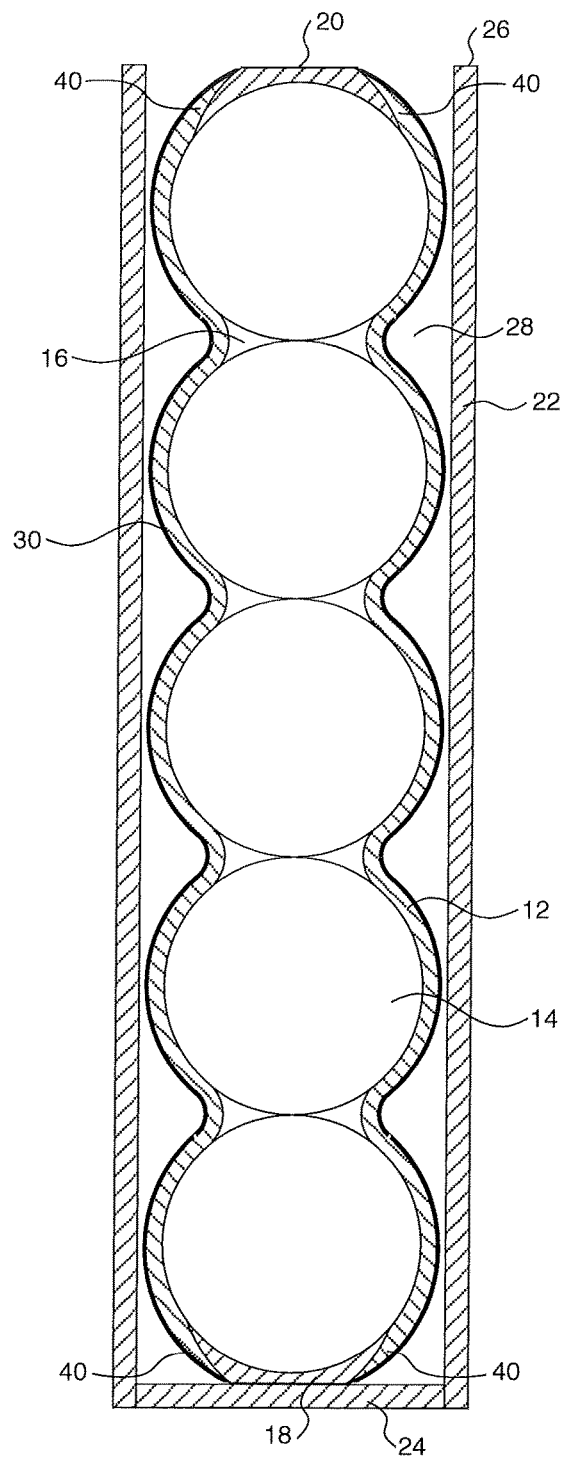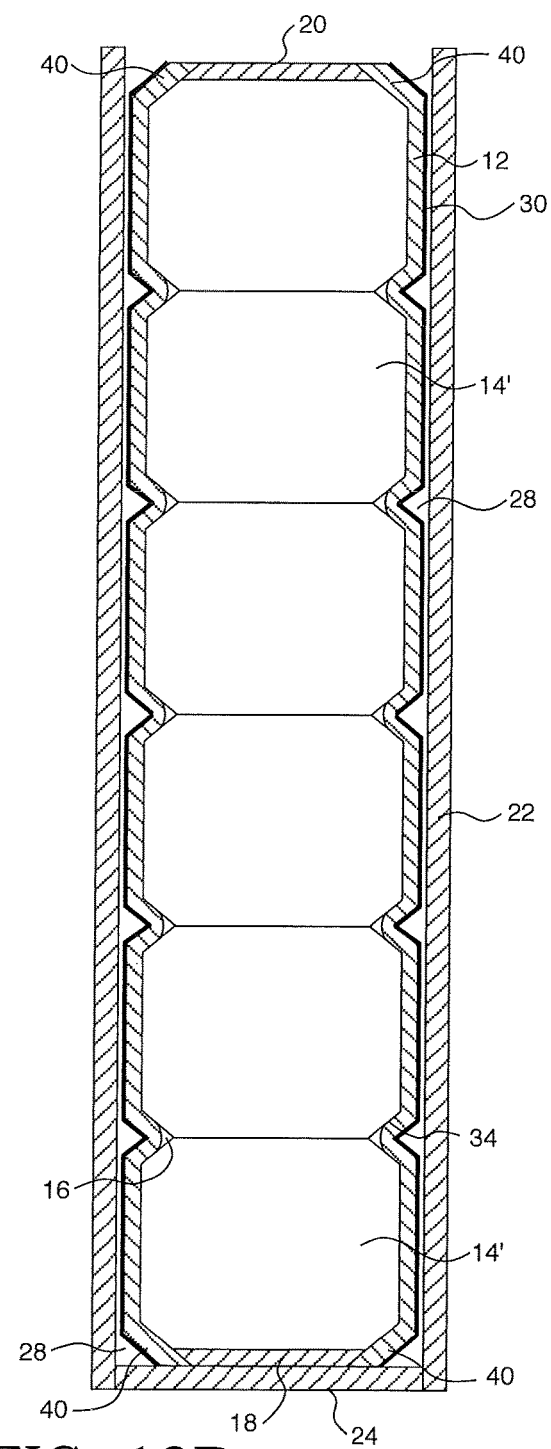
FIG. 12A
FIG. 12B

METHOD OF MANUFACTURING A REINFORCED NUCLEAR FUEL CLADDING USING AN INTERMEDIATE THERMAL DEPOSITION LAYER

STATEMENT REGARDING GOVERNMENT RIGHTS

This invention was made with government support under Contract No. DE-NE0008222 awarded by the Department of Energy. The U.S. Government has certain rights in this invention.

BACKGROUND OF THE INVENTION

1. Field of the Invention

The invention relates to nuclear power plants and more specifically, to a method of reinforcing cladding for nuclear fuel rods.

2. Description of the Background

In a typical nuclear reactor, the reactor core includes a large number of fuel assemblies, each of which is composed of a plurality of elongated fuel elements or fuel rods closed at each end with, for example, an end plug. The fuel rods each contain nuclear fuel fissile material, usually in the form of a stack of nuclear fuel pellets surrounded by a gas, such as He or $H_2$. The fuel rods have a cladding that acts as a containment for the fissile material. The cladding on the fuel rods may be made from a zirconium alloy. Exemplary zirconium (Zr) alloys are disclosed in U.S. Pat. Nos. 3,427,222; 5,075,075; and 7,139,360, the relevant portions of which are incorporated herein by reference. It has been proposed that fuel rod cladding can be coated with materials to prevent exterior corrosion as disclosed in U.S. Pat. Nos. 9,336,909 and 8,971,476, the relevant portions of which are incorporated herein by reference. Ceramic-containing coating materials, such as silicon carbide (SiC), have been shown to have desirable safety properties. Experimental ceramic type materials such as SiC monolith, fibers and their combinations are taught in U.S. Pat. Nos. 6,246,740; 5,391,428; 5,338,576; and 5,182,077, and U.S. Patent Application Publications 2006/0039524, 2007/0189952; and 2015/0078505, the relevant portions of which are incorporated herein by reference.

SiC has many desirable properties for use as a nuclear fuel cladding, particularly in "beyond design basis" accidents where, for example, temperatures exceed 1200° C. However, maintaining fission gas impermeability during flexing induced by routine handling, accidents, or natural phenomena such as earthquakes, is very difficult due to the natural inelasticity of all ceramic materials. Sealing the end plug onto the ceramic composite in a way that maintains a hermetic seal around the end plugs has also proved to be difficult. Use of an inner sleeve composed of a Zr alloy wrapped with SiC fibers has been tried. However, it is believed that the temperatures (800° C. to 1200° C.) needed during the chemical vapor infiltration (CVI) process used to deposit an additional coating of SiC within and on the SiC fibers to hold them together leads to corrosion of the Zr cladding tube.

An alternative approach attempted first making the SiC winding, separately carrying out the CVI coating process on the winding, and then fitting the winding over the Zr tube. It was found that with this approach, there are gaps formed in the spaces both on the interior and exterior of the Zr cladding tube, between the Zr cladding exterior and the SiC composite matrix and between the Zr cladding interior and the fuel pellets. These gaps result in the formation of hot spots within the pellet and cladding layer at positions along the tube with very high linear heat generation rates (>5 kw/ft). Further, when the ends of the cladding tube were not covered, a pathway was created for high temperature steam and other gases to infiltrate below the SiC composite and attack the Zr alloy tube.

In order for the nuclear fuel to maintain its geometry and to resist a loss of fuel from the core through melting, maintaining a high temperature covering over the Zr alloy cladding is required.

SUMMARY OF THE INVENTION

Problems heretofore encountered with various design approaches for nuclear fuel rods described above can be overcome by the method described herein. An improved method of manufacturing a reinforced cladding tube for nuclear fuel applications while reducing gaps within the tube is disclosed.

In various aspects, an embodiment of the method described herein includes loading a tube having a first open end and a second open end with nuclear fuel, compressing the fuel-loaded tube around the fuel to reduce free space in the tube, closing at least one of the first and second ends of the tube, filling the fuel-loaded tube with a gas suitable for transferring heat, such as helium (He) or hydrogen ($H_2$), and, covering the compressed tube with a pre-formed protective cover.

In various aspects, the method may further include closing each of the first and second open ends of the tube with a first and second end plug, respectively, wherein at least one of the first and second end plugs has a gas port. Each open end may be closed prior to filling the fuel-loaded tube with gas through the gas port. Alternatively, only one open end may be closed prior to filling the fuel-loaded tube with gas through the gas port.

In various embodiments, the method may include the steps of making a thin walled Zr alloy tube (for example, from 0.125 to 0.762 millimeters (from about 5 to 30 mils) wall thickness), loading nuclear fuel pellets into the tube, compressing the tube onto the fuel pellets, closing at least one of a first and second end of the tube, filling the tube with a gas such as He or $H_2$, then coating the tube using a thermal deposition process, such as cold spray, before inserting the tube into a pre-formed SiC composite cover having at least one closed end. Closing the second end of the SiC cover is optional. This approach can successfully provide a tube that can withstand beyond design basis accidents (above 1200° C.) and be manufactured in a cost effective manner. The method described herein in various aspects, may withstand temperatures above 1200° C. for at least an hour, or more, allowing sufficient time to take corrective action to prevent or at least minimize damage from beyond design basis accidents.

Compressing the tube may comprise using cold isostatic pressing, for example, by placing the tube into a chamber, and pressurizing the chamber with a fluid to exert sufficient force against the tube to press the tube against the fuel residing in the tube. The fluid may be a liquid or a compressed gas. Compressing the tube may comprise using a dry bag cold isostatic press wherein a flexible membrane separates the fluid from the tube. Compressing the tube may comprise using a wet bag cold isostatic press wherein the fluid contacts the tube. Compressing the tube may comprise using a roller around at least a portion of the tube.

In various aspects, a corrosion resistant coating is applied after the tube is compressed. The corrosion resistant coating may be a single layer or a dual layer, both layers being applied by a thermal deposition process, such as a cold spray process. An exemplary cold spray process comprises heating a pressurized carrier gas to a temperature between 100° C. and 1200° C., adding particles to the heated carrier gas, and spraying the carrier gas and entrained particles at a velocity of 800 to 4000 ft./sec. (about 243.84 to 1219.20 meters/sec.) onto the surface of the tube.

In various aspects, the dual layer coating may comprise an outer corrosion resistant layer of Cr or a Cr alloy and interlayer of particles selected from Mo, Ta, W, or Nb. The thickness of each layer may be between 2 and 100 microns.

BRIEF DESCRIPTION OF THE DRAWINGS

The characteristics and advantages of the present disclosure may be better understood by reference to the accompanying figures.

FIG. 8 is a schematic illustration of the pellet loaded nuclear cladding tube of FIG. 3 A following compression of the cladding tube.

FIG. 9 is a schematic illustration of the pellet loaded nuclear cladding tube of FIG. 4 A following compression of the cladding tube.

FIGS. 12 A and B are schematic views of the coated compressed nuclear fuel cladding tubes of FIGS. 8 and 9, respectively, inserted into the protective cover of FIG. 11.

DESCRIPTION OF THE PREFERRED EMBODIMENTS

As used herein, the singular form of "a", "an", and "the" include the plural references unless the context clearly dictates otherwise. Thus, the articles "a" and "an" are used herein to refer to one or to more than one (i.e., to at least one) of the grammatical object of the article. By way of example, "an element" means one element or more than one element.

Directional phrases used herein, such as, for example and without limitation, top, bottom, left, right, lower, upper, front, back, and variations thereof, shall relate to the orientation of the elements shown in the accompanying drawing and are not limiting upon the claims unless otherwise expressly stated.

In the present application, including the claims, other than where otherwise indicated, all numbers expressing quantities, values or characteristics are to be understood as being modified in all instances by the term "about." Thus, numbers may be read as if preceded by the word "about" even though the term "about" may not expressly appear with the number. Accordingly, unless indicated to the contrary, any numerical parameters set forth in the following description may vary depending on the desired properties one seeks to obtain in the compositions and methods according to the present disclosure. At the very least, and not as an attempt to limit the application of the doctrine of equivalents to the scope of the claims, each numerical parameter described in the present description should at least be construed in light of the number of reported significant digits and by applying ordinary rounding techniques.

Further, any numerical range recited herein is intended to include all sub-ranges subsumed therein. For example, a range of "1 to 10" is intended to include any and all sub-ranges between (and including) the recited minimum value of 1 and the recited maximum value of 10, that is, having a minimum value equal to or greater than 1 and a maximum value of equal to or less than 10.

Figure 3A:
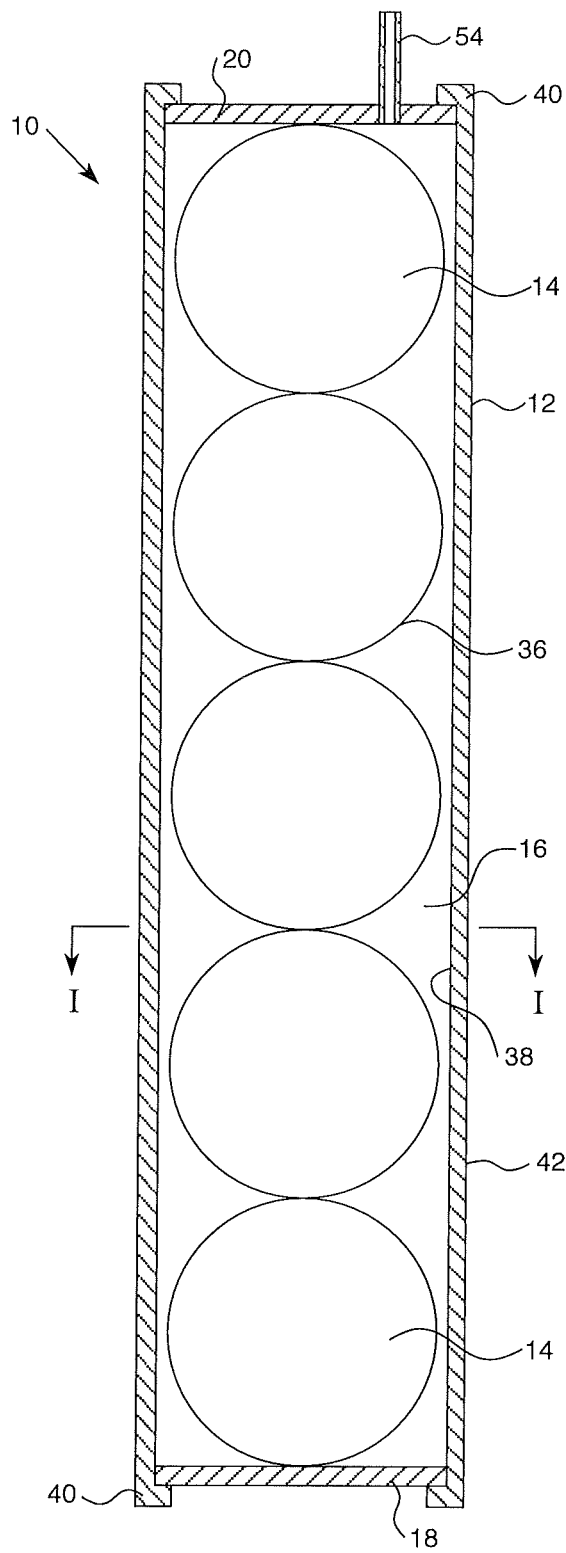
FIG. 3 A is a schematic illustration of an embodiment of a nuclear cladding tube loaded with spherical fuel pellets, and FIG. 3 B is a cross-sectional view of the cladding tube and pellets of FIG. 3 A through the line I-I.
Figure 3B:
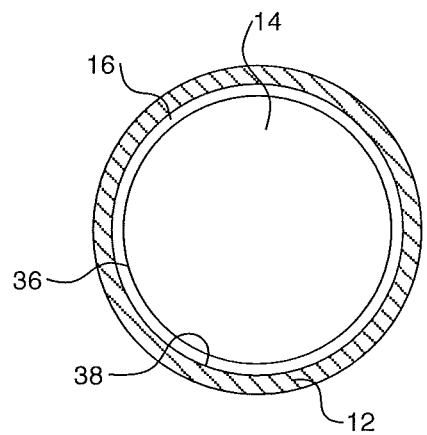

Referring to FIGS. 3 A and B, one embodiment of a fuel rod 10 is shown. The fuel rod may, in various aspects, include a cladding tube 12, open at both ends, and having an interior surface 38, and an exterior surface 42. An end plug 18, in certain aspects, may be positioned to close the open bottom end of tube 12. In various aspects, the fissile material is in the form of fuel pellets. Fissile material in the form of spheres 14 which have outer surfaces 36 may be loaded into the interior of the tube 12. The tube 12 in various aspects is a thin walled (for example, from 0.125 to 0.762 millimeter thick) Zr alloy tube loaded with nuclear fuel pellets 14 in a known manner. The free spaces 16 between of each sphere 14 and between the spheres 14 and the interior surface 38 of the tube 12 define voids or gaps.

Figure 4A:
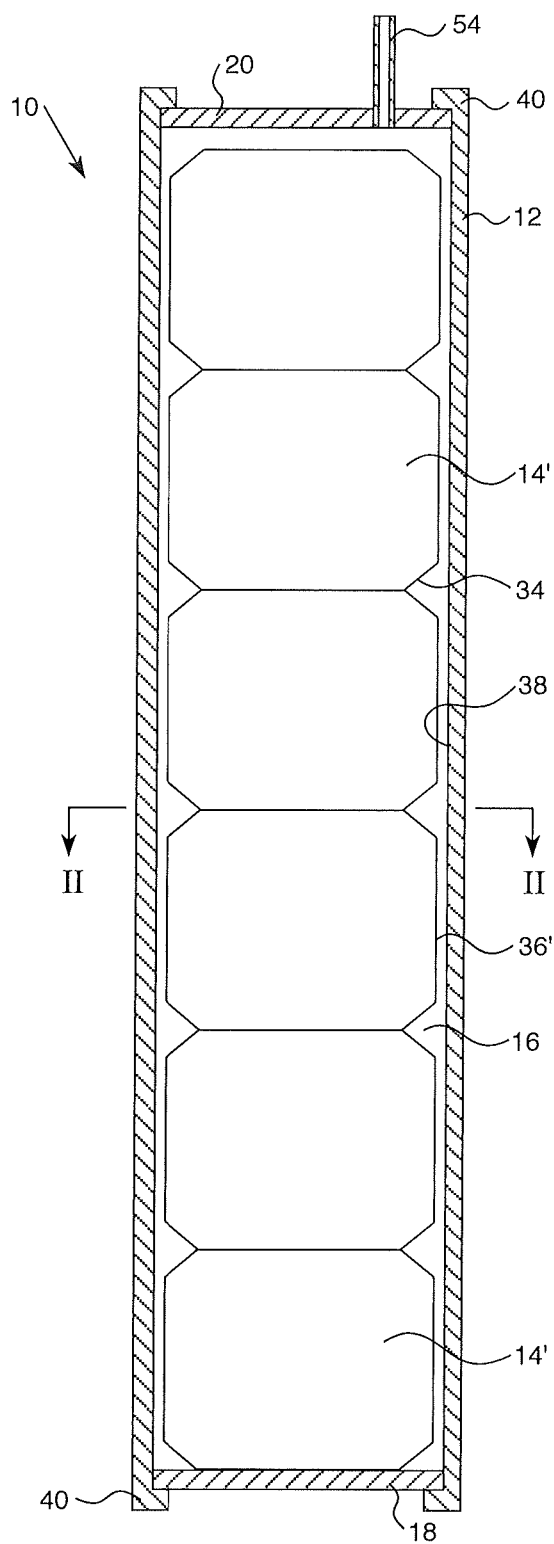
FIG. 4 A is a schematic illustration of an embodiment of a nuclear cladding tube loaded with chamfered cylindrical fuel pellets, and FIG. 4 B is a cross-sectional view of the cladding tube and pellets of FIG. 4 A through the line of FIG. 4 A.
Figure 4B:
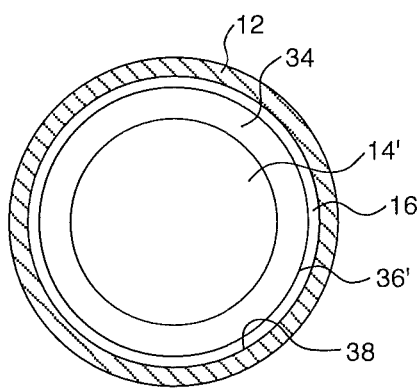

In an alternative embodiment, shown in FIGS. 4 A and B, the cladding tube 12 may be filled with cylindrical pellets 14' having chamfers 34 at the top and bottom edges of the pellet cylinder. Gaps 16 form in the areas between the chamfers 34 and cylindrical surfaces 36' of the pellets 14' and the interior surface 38 of the tube 12.

The fuel pellets may be any configuration. Typically, fuel pellets are in the form of right circular cylinders, such as those shown as pellets 14' having chamfers 34 formed therein, and may further have dishes (not shown) formed in the ends of the cylinders 14'.

To keep the gaps 16 to a minimum, the internal diameter of the tube 12 may be sized such that it is only slightly larger than the diameter of the fuel pellets 14 or 14', large enough to allow the pellets 14 or 14' to be placed in the tube 12 without damage to the pellets, but close enough in diameter to force the pellets to stack, one on top of the other, when placed in the tube 12. In various aspects, for example, the internal diameter of the tube 12 may be 0.15 millimeters larger than the diameter of the pellets 14, 14', allowing an average gap of approximately 0.075 millimeters between the exterior surface 36 or 36' of the pellet 14, 14' at its closest point to the interior surface 38 of the tube 12. Following certain process steps described more fully below, the top and bottom ends 40 and the cladding tube 12 may be rolled or otherwise compressed onto the end plugs 18, 20, after which the end plugs 18, 20 may be sealed to the tube 12 by any suitable means, such as welding. The end plugs 18 and 20 in various aspects are the same diameter as the pellets 14, 14'.

Figure 10:
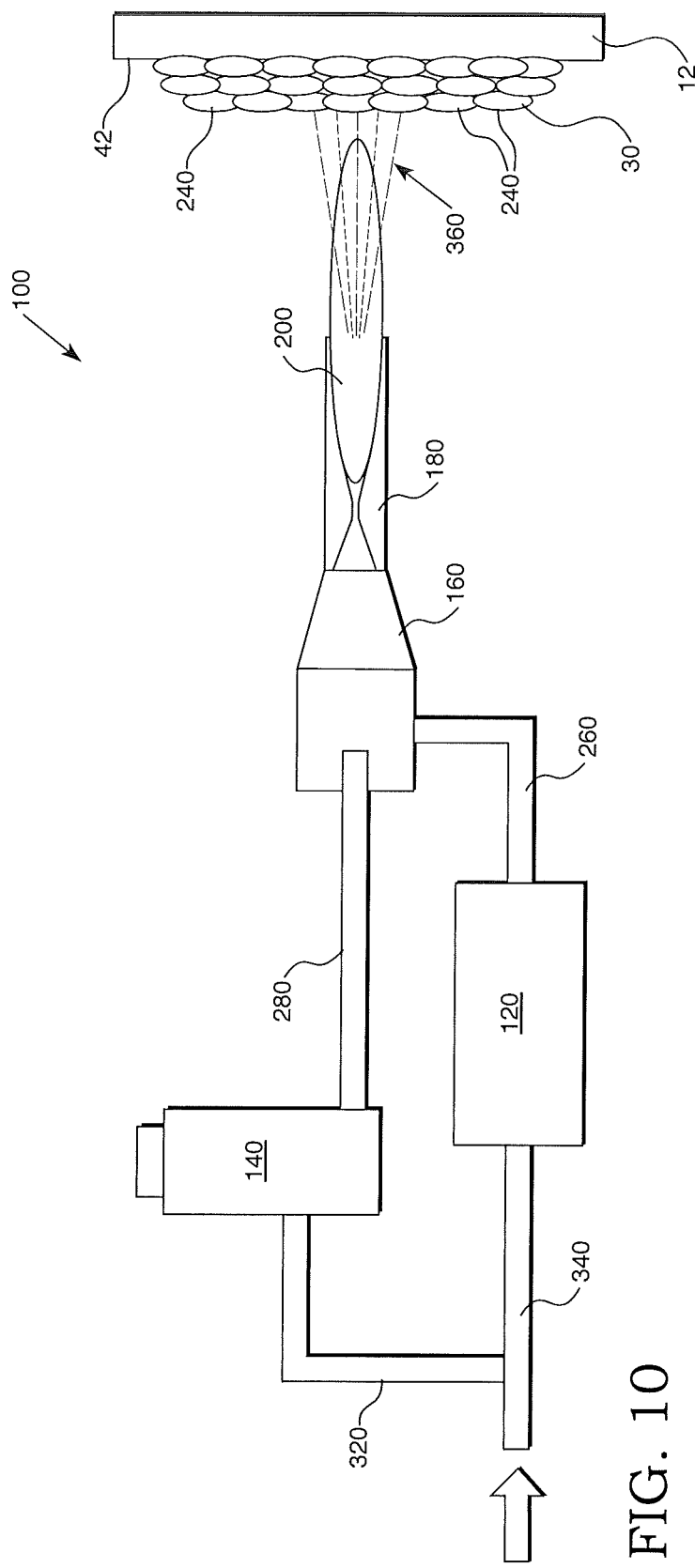
FIG. 10 is a schematic illustration of an exemplary coating system for applying a protective coating to a compressed nuclear fuel rod, like that shown in FIGS. 8 and 9.

An improved method for manufacturing a composite fuel rod 10 is described herein. In various aspects, the method includes reducing, and preferably substantially reducing, and most preferably eliminating free space 16, such as gas gaps and gaseous pathways between the fuel material and the cladding tube 12 that holds the fissile material (see FIGS. 8-9), coating the tube with a protective material 30 (see FIGS. 10 and 12), and placing the coated tube 12 within an outer protective covering 22 (see FIG. 12). In certain aspects, the fuel cladding tube 12 is formed from a zirconium (Zr) alloy, preferably a thin-walled Zr alloy of about 0.125 to 0.762 millimeters wall thickness. In certain aspects, the protective covering 22 is formed from a ceramic composite, such as a silicon carbide (SiC) composite.

The method may in general proceed by loading a tube 12 with fissile material 14 or 14', compressing the tube 12 around the fissile material 14, 14' to reduce the free space 16 between the fissile material 14, 14' and the interior 38 of the tube 12, closing at least one open end of the tube, e.g., a first end, with a first end plug 18 or 20, filling the tube 12 with gas to a desired pressure, and closing the other open end, e.g., a second end, with a second end plug 18 or 20. In various aspects, the desired pressure may be from 0 to 40 atmospheres.

Alternatively, the method may proceed by loading a tube 12 with fissile material 14, closing the ends of the tube with end plugs 18, 20, wherein at least one end plug has a port therein to allow gas to escape during the compression step, compressing the tube 12 around the fissile material 14 to reduce the free space 16 between the fissile material 14 and the interior 38 of the tube 12, and filling the tube 12 with gas through a gas fill port 54 to a desired pressure.

Figure 1:
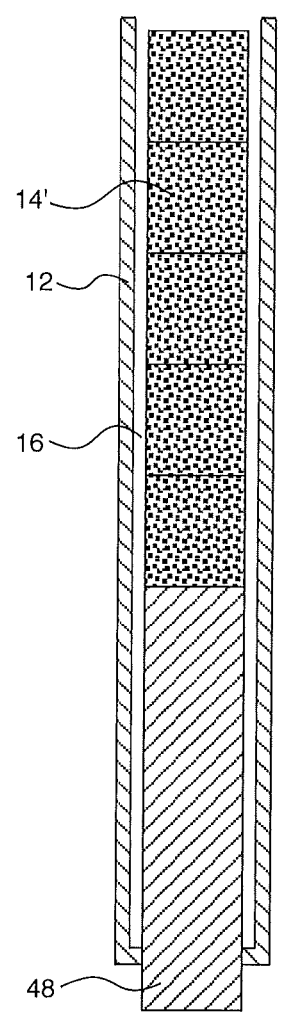
FIG. 1 schematically illustrates a thin walled cladding tube with a solid bar inserted in one open end thereof to maintain the internal diameter of the tube during loading with fuel pellets.
Figure 2:
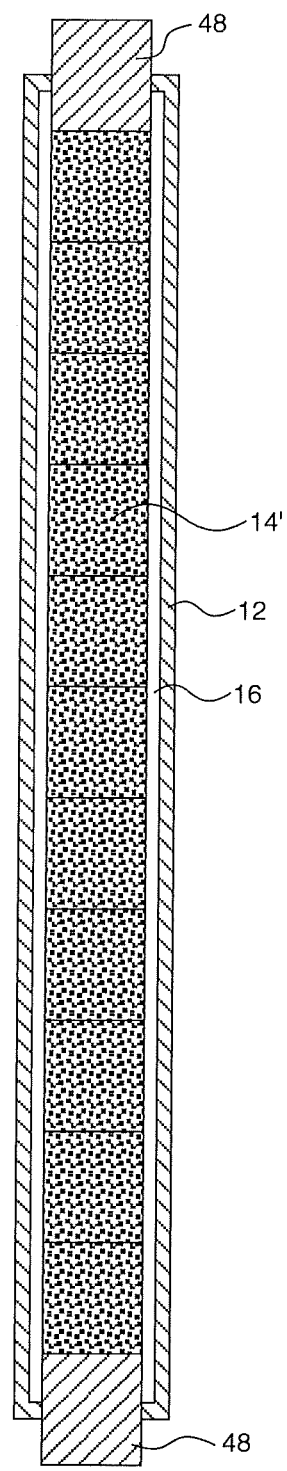
FIG. 2 illustrates the cladding tube of FIG. 1 with a solid bar inserted in both open ends of the tube to maintain the tube's internal diameter during compression.

In various aspects, the method may include fabricating a thin-walled Zr alloy tube 12 to a length longer than needed for the finished fuel rod 10. As shown in FIGS. 1 and 2, a solid bar 48 may be inserted into one open end of the tube 12 to maintain the internal diameter of the tube 12. The tube 12 may then be loaded with fuel pellets 14 or 14'. A second solid bar 48 may be inserted into the remaining open end of the tube 12. The fuel-loaded tube 12 may be placed in an isostatic press to compress the tube 12 around the fuel pellets 14, 14' to reduce or substantially if not completely eliminate free space 16 within the tube 12 around the pellets 14, 14'.

In order to reduce the size of, and preferably eliminate, the free space or gaps 16 as much as possible, the pellet-loaded cladding tube 12 may, in various aspects, be compressed onto the pellets 14, 14' until the interior surface 38 of tube 12 is in contact with the surfaces 36, 36' of pellets 14 or 14', respectively. In one embodiment of the method, this step may be performed by putting the pellet-loaded cladding tubes 12 into a high pressure chamber 52, and pressurizing the chamber using a high pressure fluid, such as water, other liquids, or compressed gas in a plenum 56 defined between the inside of the chamber 52 and either the tube 12 in a wet bag cold isostatic press 50 or a flexible liner membrane 64 in a dry bag cold isostatic press 60. In an alternative embodiment of the method, the step may be performed mechanically by applying inward pressure circumferentially using a bladder or roller around some or all of the tube 12 to compress all of the exterior surface 42 of the metal alloy tube 12 simultaneously or in stages, taking care to avoid damage to the pellets 14 in the interior of the tube 12.

Figure 5:
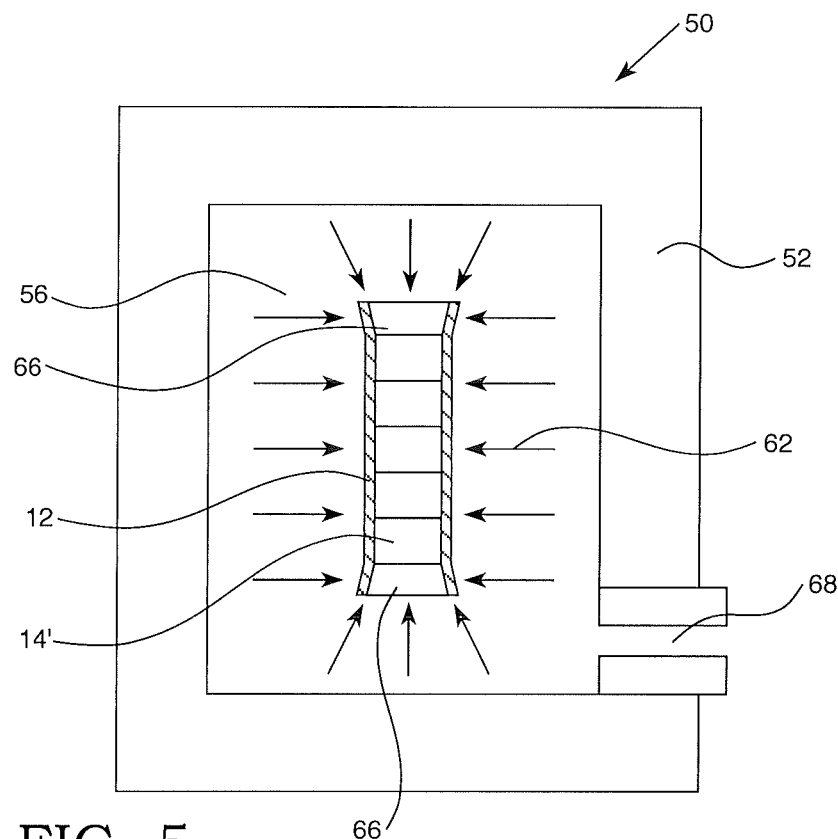
FIG. 5 is a schematic illustration of a wet bag cold isostatic press.
Figure 6:
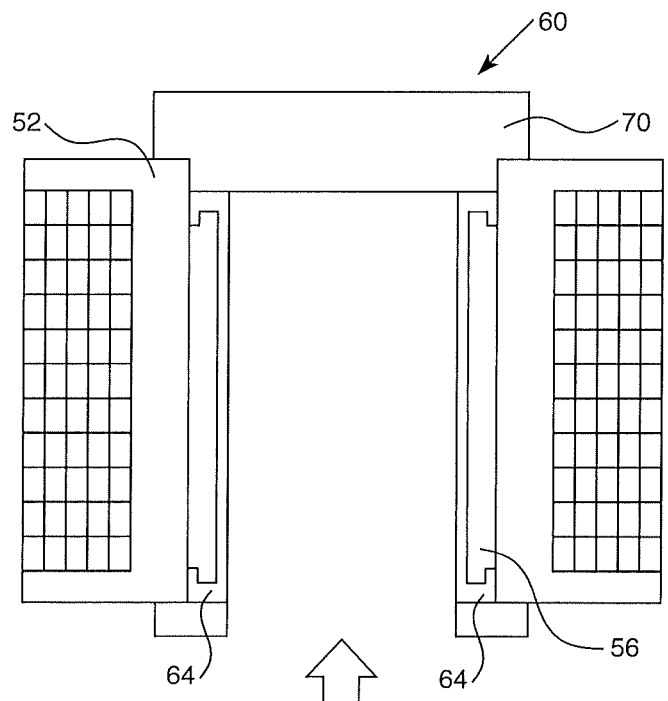
FIG. 6 is a schematic illustration of a dry bag cold isostatic press.
Figure 7:
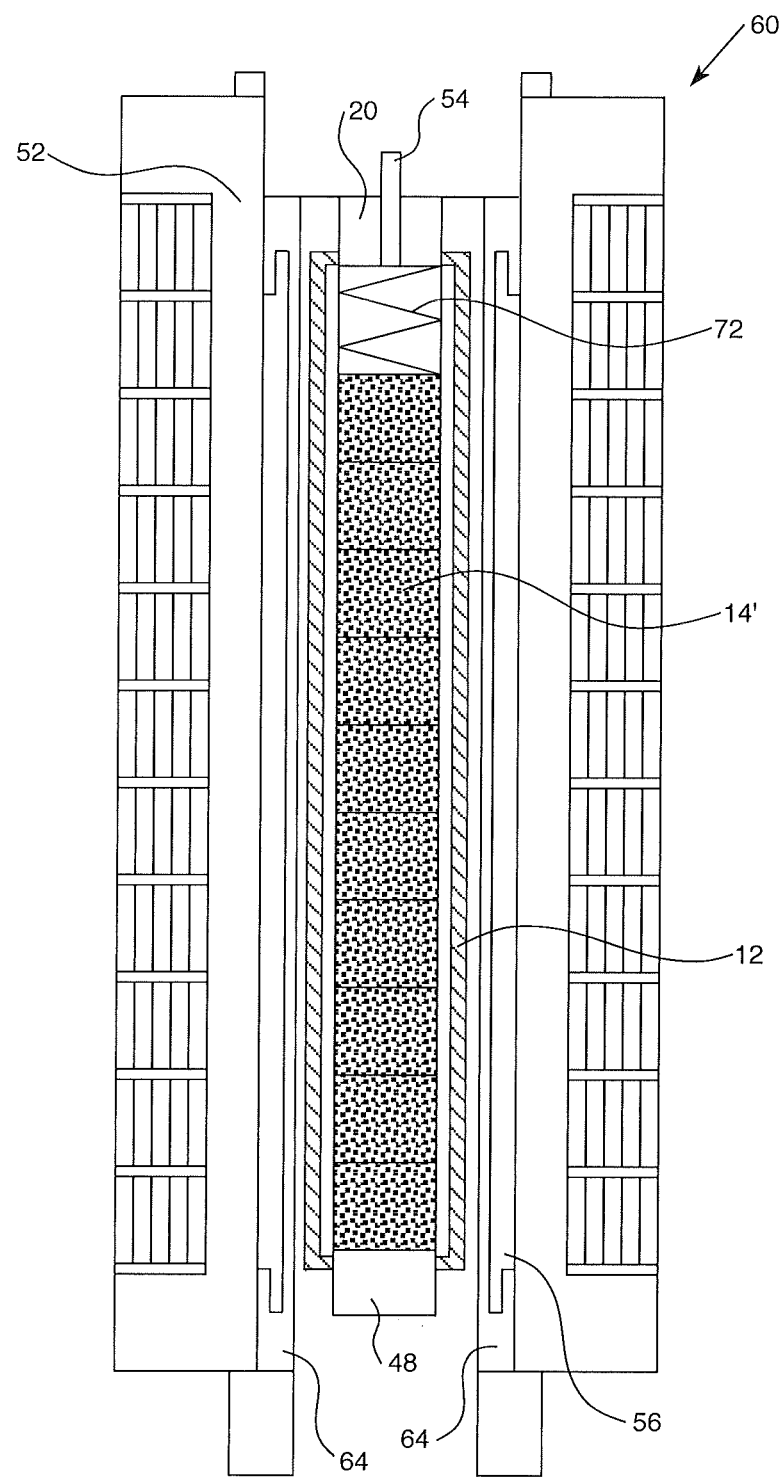
FIG. 7 is a schematic illustration of a fuel-loaded tube in the chamber of a dry bag cold isostatic press.

An exemplary wet bag cold isostatic press 50 is illustrated in FIG. 5 and an exemplary dry bag cold isostatic press 60 is illustrated in FIG. 6. Both presses 50 and 60 include a chamber 52, a plenum 56 for filling with a pressurized fluid, such as a liquid or a gas, and an inlet port 68 (not shown in FIG. 6). In use, the wet bag press 50 holds the fuel-loaded tube 12 in the plenum 56. Stoppers 66 are placed on each open end of the tube 12 if the tube has not been previously closed on one or both ends with an end plug 18, 20. Pressurized fluid fills the plenum 56 and pressure is applied against the outside of the tube 12 sufficient to compress the tube 12 against the fuel pellets 14 or 14' to reduce or substantially if not completely eliminate free space 16 within the tube 12 around the pellets 14, 14'. In use, as shown in FIG. 7, the dry bag press 60 receives the fuel-loaded tube 12 into a space defined within a flexible liner 64. When the pressurized fluid fills the plenum 56, the flexible liner 64 expands and applies pressure against the outside of the tube 12 sufficient to compress the tube 12 against the fuel pellets 14 or 14' to reduce or substantially if not completely eliminate free space 16 within the tube 12 around the pellets 14, 14'. FIGS. 8 and 9 illustrate tubes 12 after being compressed. Depending on the configuration of the pellets 14, 14', the free space 16 is reduced or substantially reduced. Those skilled in the art will recognize that however small, some free space will remain in tube 12. That space will be filled with a gas.

In various aspects, the tube 12 may be filled with gas to the desired pressure, followed by closing the open end or ends of the tube 12 with end plugs 18, 20. In various aspects, the tube 12 may alternatively, or additionally, be filled with gas through a gas fill port 54 in one or both end plugs 18, 20, after the open ends of tube 12 are closed. The gas in various aspects is a gas with good heat transfer properties, such as He or $H_2$ gas.

In those aspects where solid bars 48 were placed in the tube 12 prior to compression, the solid bars 48 are removed. If the tube 12 was fabricated to be longer than necessary for the final end product, the excess length is cut where needed, from one or both ends of the tube 12. End plugs 18 and 20 are then inserted onto the open ends of the tube 12, and preferably sealed, such as by welding, in place.

In certain aspects, a plenum spring 72 may be placed in one end, such as the top end, of the tube 12 before the top end plug 20 is welded in place. One or both of the end plugs 18, 20 may have a gas fill port 54. A gas, such as helium or hydrogen is introduced into the tube 12 through the gas fill port 54.

Following compression and gas filling in any of the alternative aspects of the method, the compressed tube 12 may be, in various embodiments, coated with a protective coating 30, such as a corrosion resistant layer. The coating may be applied using a thermal process, such as a cold spray process.

In certain aspects, the corrosion resistant layer may be comprised of a dual layer that may include an interlayer and an outer layer. In certain aspects, the corrosion resistant layer may comprise a single layer.

Application of the corrosion resistant layer 30 on the exterior surface of the compressed tube 12 may, for example, include forming on the exterior of the compressed cladding tube 12 an interlayer with particles, preferably transition metal particles, such as molybdenum (Mo), niobium (Nb), tantalum (Ta), tungsten (W) and other particles, each particle having a diameter of 100 microns or less; and then forming an outer layer on the interlayer with particles selected from the group consisting of Cr, a Cr alloy, and combinations thereof. The outer layer particles may have a diameter of 100 microns or less. Alternatively, the corrosion resistant layer may be a single layer formed from particles selected from the group consisting of Cr, a Cr alloy, and combinations thereof.

When the corrosion resistant layer particles or outer layer particles are chromium-based alloys, they may comprise 80 to 99 atom % of chromium. In various aspects, the chromium-based alloy may include at least one element selected from the group consisting of silicon, yttrium, aluminum, titanium, niobium, zirconium, and transition metal elements, at a combined content of 0.1 to 20 atomic %. In various aspects, the Cr alloy may be FeCrAlY.

When the interlayer deposition process is a cold spray process, the method may further include heating a pressurized carrier gas to a temperature between 200° C. and 1000° C.; adding the interlayer particles to the heated carrier gas; and spraying the carrier gas and entrained particles at a velocity of 800 to 4000 ft./sec. (about 243.84 to 1219.20 meters/sec.) onto the cladding tube 12.

When the outer layer deposition process is a cold spray process, the method may further include heating a pressurized carrier gas to a temperature between 200° C. and 1000° C.; adding the Cr or Cr alloy particles to the heated carrier gas; and spraying the carrier gas and entrained Cr or Cr alloy particles at a velocity of 800 to 4000 ft./sec. (about 243.84 to 1219.20 meters/sec.) onto the interlayer.

The carrier gas is advantageously selected from inert and unreactive gases. In various aspects, the carrier gas may be selected from the group consisting of nitrogen, hydrogen, argon, carbon dioxide, helium, and combinations thereof. The carrier gas may be heated at a pressure up to 5.0 MPa.

The carrier gas and particles are preferably sprayed continuously at very high rates until the desired coating thickness is reached. The coating thickness may, for example, be between 5 and 100 microns, but greater thicknesses of, for example, several hundred microns, may be deposited or lesser thicknesses of, for example, 0.5 to 1 microns, may be deposited.

In various aspects, one or both layers may be applied using a thermal deposition process. For example, the process may be conducted in an assembly such as that shown in FIG. 5. Referring to FIG. 5, a cold spray assembly 100 is shown. Assembly 100 includes a heater 120, a powder or particle hopper 140, a gun 160, nozzle 180 and delivery conduits 340, 260, 320 and 280. High pressure gas enters conduit 340 for delivery to heater 120, where heating occurs quickly; substantially instantaneously. When heated to the desired temperature, the gas is directed through conduit 260 to gun 160. Particles held in hopper 140 are released and directed to gun 160 through conduit 280 where they are forced through nozzle 180 towards the exterior surface 42 of tube 12 by the pressurized gas jet 200. To form the interlayer, the sprayed particles 360 are deposited onto the exterior surface 42 of tube 12 to form the interlayer portion of protective layer 30 comprised of particles 240.

In general, the interlayer material may be chosen from those materials having a eutectic melting point with the zirconium or zirconium alloys that is above 1400° C. and thermal expansion coefficients and elastic modulus coefficients compatible with the zirconium or zirconium alloy on which it is coated and the coating which is applied above it. The particles used to form the interlayer may be Mo, but alternatively Ta, W or Nb particles, all of which form eutectics with Zr or Zr alloys greater than 1400° C., and in various aspects, greater than 1500° C.

In certain aspects, the particles used to form the interlayer may be Mo particles. Mo particles (or any of the other suitable interlayer particles) are added to hopper 140. The interlayer particles become entrained in the carrier gas when brought together in gun 160. The nozzle 180 narrows to force the particles and gas together and to increase the velocity of the gas jet 200 exiting nozzle 180. The particles are sprayed onto the exterior surface 42 of tube 12 at a velocity sufficient to provide a compact, impervious, or substantially impervious layer. In various aspects the velocity of the jet spray may be from 800 to 4000 ft./sec. (about 243.84 to 1219.20 meters/sec.).

The interlayer may be ground and polished before deposition of the outer, corrosion resistant layer, which can be ground and polished thereafter.

In various aspects of the method, the particles used for the outer or corrosion resistant layer may be pure metallic chromium particles that have an average diameter of less than 20 microns. By "average diameter," as used herein, those skilled in the art will recognize that the particles may be both spherical and non-spherical so that the "diameter" will be the longest dimension of the regularly or irregularly shaped particles, and the average diameter means that there will be some variation in the largest dimension of any given particle above or below 20 microns, but the average of the longest dimension of all particles used in the coating are together, 20 microns or less.

The chromium or chromium-based alloy particles are solid particles. In the dual layer protective coating 30, following application of the interlayer, the outer layer is applied. In the embodiment having a single corrosion resistant layer, it is applied following the compression step in the absence of an interlayer deposition step. In either case, the outer layer or the single corrosion resistant layer, chromium or chromium alloy particles or a combination thereof, are added to the hopper 140. The chromium or chromium alloy particles become entrained in the carrier gas when brought together in gun 160. The nozzle 180 narrows to force the particles and gas together and to increase the velocity of the gas jet 200 exiting nozzle 180. The particles are sprayed at a velocity sufficient to provide a compact, impervious, or substantially impervious, Cr and/or Cr-based alloy layers. In various aspects the velocity of the jet spray may be from 800 to 4000 ft./sec. (about 243.84 to 1219.20 meters/sec.). The particles 240 are deposited onto the surface of the interlayer or directly onto the surface 42 of tube 12 in the absence of an interlayer, at a rate sufficient to provide the desired production rate of coated tubing 12, at a commercial or research level.

The rate of particle deposition for either of the layers depends on the powder apparent density (i.e., the amount of powder vs. the air or empty space in a specific volume) and the mechanical powder feeder or hopper used to inject the powder particles into the gas stream. Those skilled in the art can readily calculate the rate of deposition based on the equipment used in the process, and can adjust the rate of deposition by altering the components that factor into the rate. In certain aspects of the method, the rate of particle deposition may be up to 1000 kg/hour. An acceptable rate is between 1 and 100 kg/hour, and in various aspects, between 10 and 100 kg/hour, but higher and lower rates, such as 1.5 kg/hour, have been successfully used.

The cold spray process relies on the controlled expansion of the heated carrier gas to propel the particles onto the substrate. The particles impact the surface of tube 12 or a previous deposited layer and undergo plastic deformation through adiabatic shear. Subsequent particle impacts build up to form the coating 30. The particles may also be warmed to temperatures one-third to one-half the melting point of powder expressed in degrees Kelvin before entering the flowing carrier gas in order to promote deformation. The nozzle 180 is rastered (i.e., sprayed in a pattern in which an area is sprayed from side to side in lines from top to bottom) across the area to be coated or where material buildup is needed. The tube 12 may be rotated as the nozzle moves lengthwise across the tube surface. The nozzle traverse speed and tube rotation are in synchronized motion so that uniform coverage is achieved. The rate of rotation and speed of traverse can vary substantially as long as the movement is synchronized for uniform coverage. The tube 12 may require some surface preparation such as grinding or chemical cleaning to remove surface contamination to improve adherence and distribution of the coating. The coating may be polished or not, depending on the surface texture that is desired.

Figure 11:
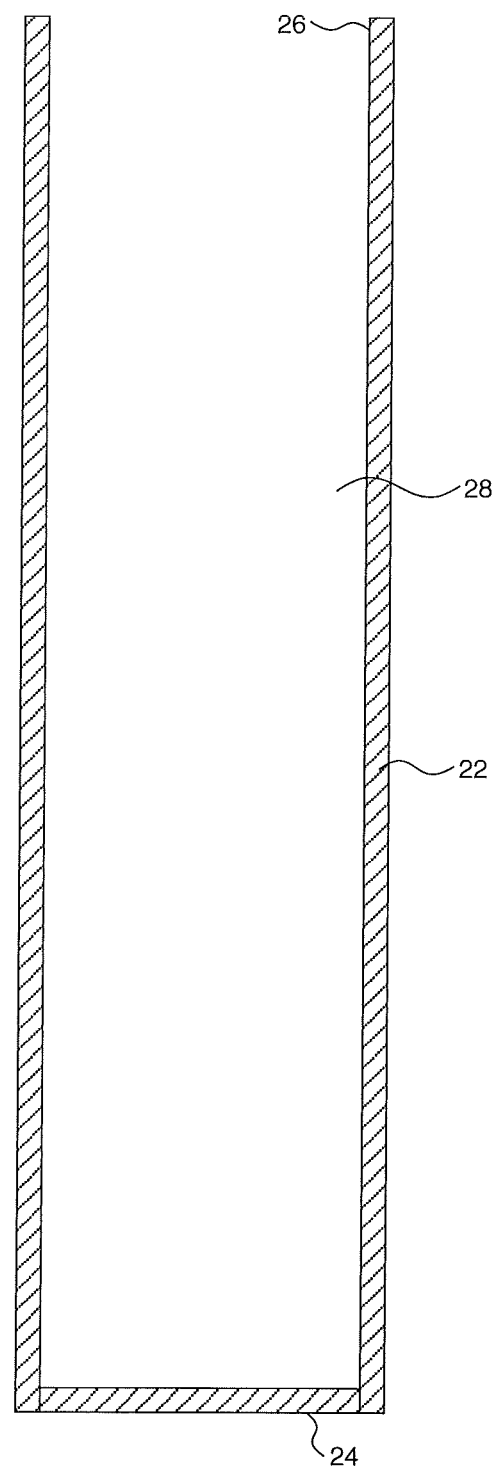
FIG. 11 is a schematic view of an embodiment of a protective cover for use with the cladding tubes of FIG. 8 or 9.

Following the coating step, the coated, pellet-filled compressed tube 12 is placed in a protective covering having a closed end. FIG. 11 illustrates an exemplary cover 22 with closed bottom end 24. In various aspects, the SiC composite cover 22 is a pre-formed tube having an internal diameter only slightly larger than the external diameter of the coated compressed tube 12 to permit the tube 12 to be inserted within cover 22 without damage but to minimize gaps and pathways between the exterior of the coated compressed tube 12 and the inner surface of the cover 22. The coated compressed pellet filled tube 12 is inserted into the SiC pre-formed cover 22. The bottom end 24 of the SiC cover 22 is closed. The top end 26 of the SiC cover 22 may remain open or may be closed.

In various aspects, the protective covering is made of a SiC matrix composite material and is formed using established manufacturing techniques. In various aspects, the SiC composite layer is between 0.10 and 0.80 millimeters thick. As shown in FIGS. 12 A and B, the compressed pellet-loaded cladding tube 12 is inserted into the SiC cover 22 with the tolerance only large enough to allow loading or to allow for pellet swelling.

It is desirable to use SiC as the outer cover 22 of the fuel rod 10 and to use a metal protected by a corrosion resistant coating as the inner cladding tube 12. The outer SiC cover 22 does not need to be hermetically sealed since the inner cladding tube 12 provides that function. Sealing the end plugs 18, 20 is not an issue since the end plugs 18, 20 are welded onto the cladding tube 12. The SiC cover 22 supports the inner metal cladding tube 12 when the reactor pressure is low (e.g., outages and a loss of coolant accident or a long term station blackout resulting in reactor depressurization) and limits the surface area of the inner cladding tube 12 that would be exposed to steam or air at >1200° C. (thereby preventing a temperature spike driven by the autocatalytic oxidation of the zirconium). It also has the advantage of preventing blow-out at 900° C. that the coated only tubes 12 would have.

The improved method described herein is expected to result in a minimal overall gap 16 since the pellet/cladding gap 16 will have been eliminated or significantly reduced in size, and the cladding/cover gap 28 is minimal. The cladding/cover gap 28 can be minimal since relatively large forces can be applied to the loaded tube 12 as it is inserted into the SiC cover 22 since the cover 22 does not have to maintain 100% hermeticity but can be as low as 90%. Therefore, as the pellet-loaded tube 12 is inserted into the cover 22, any cracking that may potentially occur in the SiC cover 22 does not present a problem. Secondly, the geometry of the end plugs 18, 20 on the inserted end can help guide the loaded tube 12 into the SiC cover 22 past the uneven surface features on the inner diameter of the SiC cover 22. The overall combined gaps 16 and 28 can therefore be sized as required by the need to minimize the forces exerted by the pellets 14, 14' as they swell during irradiation and push outward on the thin-walled metal cladding 12 and then onto the SiC outer cover 22.

It is known that to minimize SiC corrosion, higher temperatures will be required for the chemical vapor infiltration (CVI) and deposition (CVD) than are normally used. This generally results in lower overall SiC matrix density which results in lower compressive strength. Methods to pre-fill the woven SiC matrix before performing chemical vapor infiltration is carried out. Electrostatic particle deposition (EPD) may be used with nano sized particles of SiC to prefill the interstices between the woven fibers. The CVI process than can proceed to deposit SiC at high temperature to achieve a corrosion resistant layer which will mainly occur on the surface of the composite. Since the interstices have been pre-filled with SiC nano particles, however, the matrix will have a high density and therefore a high strength. However, the function of the SiC cover 22 is to provide tensile strength to the composite. The tensile strength component is provided by the fibers which are not affected by the higher temperatures. Therefore, if lower SiC matrix composite densities result due to the use of higher infiltration and deposition temperatures, the lower composite density will not be an issue.

The method described herein eliminates, or at least substantially reduces the size of the internal pellet/cladding gap 16 during manufacture of the fuel rod 10 by compressing the cladding around the stacked fuel pellets. For optimum corrosion resistance of the metal alloy tube 12, a coating, either in a single or dual layer, is applied to the metal cladding to cover the entire metal surface. By separately forming the protective cover 22 and placing the coated compressed cladding into the cover 22, higher SiC infiltration and deposition temperatures can be used in making the cover 22 to minimize SiC corrosion even if it results in somewhat lower SiC composite density. In this way, the overall thickness of the cladding tube 12 wall can be significantly less than the thickness of a 100% SiC tube with the same hermeticity and strength specifications. The improved method described herein will provide a SiC protective cover 22 that can hold the cladding tube 12 together and reduce corrosion to >1800° C., far higher than other metal alloys and much greater than Zr alloys alone. The overall neutron cross-section of the tube 12 can be less than the current Zr alloy tubing alone since the wall thickness is supported by the SiC cover 22 and a much thinner wall can be used while the SiC cover 22 has a cross-section only 25% of that of Zr alloys.

The present invention has been described in accordance with several examples, which are intended to be illustrative in all aspects rather than restrictive. Thus, the present invention is capable of many variations in detailed implementation, which may be derived from the description contained herein by a person of ordinary skill in the art.

All patents, patent applications, publications, or other disclosure material mentioned herein, are hereby incorporated by reference in their entirety as if each individual reference was expressly incorporated by reference respectively. All references, and any material, or portion thereof, that are said to be incorporated by reference herein are incorporated herein only to the extent that the incorporated material does not conflict with existing definitions, statements, or other disclosure material set forth in this disclosure. As such, and to the extent necessary, the disclosure as set forth herein supersedes any conflicting material incorporated herein by reference and the disclosure expressly set forth in the present application controls.

The present invention has been described with reference to various exemplary and illustrative embodiments. The embodiments described herein are understood as providing illustrative features of varying detail of various embodiments of the disclosed invention; and therefore, unless otherwise specified, it is to be understood that, to the extent possible, one or more features, elements, components, constituents, ingredients, structures, modules, and/or aspects of the disclosed embodiments may be combined, separated, interchanged, and/or rearranged with or relative to one or more other features, elements, components, constituents, ingredients, structures, modules, and/or aspects of the disclosed embodiments without departing from the scope of the disclosed invention. Accordingly, it will be recognized by persons having ordinary skill in the art that various substitutions, modifications or combinations of any of the exemplary embodiments may be made without departing from the scope of the invention. In addition, persons skilled in the art will recognize, or be able to ascertain using no more than routine experimentation, many equivalents to the various embodiments of the invention described herein upon review of this specification. Thus, the invention is not limited by the description of the various embodiments, but rather by the claims.

What is claimed is:

1. A method for making a fuel rod comprising:
   loading a tube having a first open end and a second open end with nuclear fuel, then
   compressing the fuel-loaded tube around the fuel to reduce free space in the tube, then
   closing at least one of the first and second ends of the tube, then
   filling the fuel-loaded compressed tube with a gas suitable for transferring heat, and then
   covering the compressed tube with a pre-formed protective cover such that a gap sized to allow tube swelling is defined between the protective cover and the compressed tube.

2. The method recited in claim 1 further comprising closing each of the first and second open ends of the tube with a first and second end plug, respectively, wherein at least one of the first and second end plugs has a gas port.

3. The method recited in claim 2 wherein each open end is closed prior to filling the fuel-loaded tube with gas through the gas port.

4. The method recited in claim 1 wherein compressing the tube comprises placing the tube into a chamber, and pressurizing the chamber with a fluid to exert sufficient force against the tube to press the tube against the fuel residing in the tube.

5. The method recited in claim 4 wherein the fluid is one of a liquid or a compressed gas.

6. The method recited in claim 4 wherein the chamber is a cold isostatic press.

7. The method recited in claim 6 wherein the chamber is a dry bag cold isostatic press wherein a flexible membrane separates the fluid from the tube.

8. The method recited in claim 6 wherein the chamber is a wet bag cold isostatic press wherein the fluid contacts the tube.

9. The method recited in claim 4 wherein the inwardly directed pressure is applied with a roller around at least a portion of the tube.

10. The method recited in claim 1 further comprising applying a corrosion resistant coating on the compressed tube before covering the compressed tube with the pre-formed cover.

11. The method recited in claim 10 wherein the corrosion resistant coating is applied with a thermal deposition process.

12. The method recited in claim 11 wherein the thermal deposition process is a cold spray process.

13. The method recited in claim 12 wherein the cold spray process comprises:
   heating a pressurized carrier gas to a temperature between 100° C. and 1200° C.;
   adding particles to the heated carrier gas; and
   spraying the carrier gas and entrained particles at a velocity of 800 to 4000 ft./sec. (about 243.84 to 1219.20 meters/sec.).

14. The method recited in claim 13 wherein the carrier gas is selected from the group consisting of nitrogen ($N_2$), hydrogen ($H_2$), argon (Ar), carbon dioxide ($CO_2$), and helium (He) and combinations thereof.

15. The method recited in claim 13 wherein the particles are selected from the group consisting of chromium, chromium alloys, and combinations thereof.

16. The method recited in claim 10 wherein the corrosion resistant coating comprises applying dual layer.

17. The method recited in claim 16 wherein applying the dual layer comprises applying an interlayer using a first cold spray process and applying an outer layer using a second cold spray process, wherein the particles used to form the interlayer are transition metal particles selected from the group consisting of molybdenum (Mo), niobium (Nb), tantalum (Ta), tungsten (W) and combinations thereof, and the particles used to form the outer layer are selected from the group consisting of chromium, chromium alloys, and combinations thereof.

18. The method recited in claim 1 wherein the tube is made of a Zr alloy.

19. The method recited in claim 1 wherein the pre-formed protective cover is made of a SiC composite material.

20. The method recited in claim 1 wherein the gas is selected from the group consisting of $H_2$, He, and combinations thereof.

21. The method recited in claim 1 wherein the fuel comprises stacked pellets of fissile material.

22. The method recited in claim 21 wherein the diameter of the end plugs are about the same diameter as that of the pellets.

23. A method for making a fuel rod comprising:
   providing a hollow tube having top and bottom open ends and inner and outer surfaces, then
   stacking fissile material into the hollow tube, then
   compressing the tube against the stacked fissile material to reduce available free space between the fissile material and the inner surface of the tube using a cold isostatic pressing process, then
   closing at least one of the top and bottom ends of the tube with an end plug, at least one end plug having a gas port therethrough, then
   adding a gas suitable for heat transfer to the tube through the gas port in the end plug, then
   closing the port, then
   applying a corrosion resistant coating to the outer surface of the compressed tube, then providing a pre-formed cover, and then placing the coated compressed tube into the pre-formed cover, such that a gap sized to allow tube swelling is defined between the protective cover and the compressed tube.

24. The method recited in claim 23 wherein compressing the tube comprises placing the tube into a chamber, and pressurizing the chamber with a fluid to exert sufficient force against the tube to press the tube against the fissile material residing in the tube.

25. The method recited in claim 24 wherein the fluid is one of a liquid or a compressed gas.

26. The method recited in claim 25 wherein the chamber is a cold isostatic press.

27. The method recited in claim 26 wherein the chamber is a dry bag cold isostatic press wherein a flexible membrane separates the fluid from the tube.

28. The method recited in claim 26 wherein the chamber is a wet bag cold isostatic press wherein the fluid contacts the tube.

29. The method recited in claim 24 wherein the inwardly directed pressure is applied with a roller around at least a portion of the tube.

30. The method recited in claim 23 wherein the corrosion resistant coating is applied by a thermal deposition process.

31. The method recited in claim 30 wherein the thermal deposition process is a cold spray process comprising:

heating a pressurized carrier gas selected from the group consisting of nitrogen ($N_2$), hydrogen ($H_2$), argon (Ar), carbon dioxide ($CO_2$), and helium (He) and combinations thereof to a temperature between 100° C. and 1200° C.;

adding particles for forming an outer layer, the outer layer particles selected from the group consisting of chromium, chromium alloys, and combinations thereof to the heated carrier gas; and spraying the carrier gas and entrained particles at a velocity of 800 to 4000 ft./sec. (about 243.84 to 1219.20 meters/sec.).

32. The method recited in claim 31 wherein the corrosion resistant coating comprises applying dual layers, the dual layers comprised of an interlayer applied by a cold spray process before application of the outer layer, wherein the particles of the interlayer are transition metal particles selected from the group consisting of molybdenum (Mo), niobium (Nb), tantalum (Ta), tungsten (W) and combinations thereof.

* * * * *